G. H. CURTISS.
MOTIVE POWER SYSTEM FOR AIRCRAFT.
APPLICATION FILED JUNE 11, 1919.
1,418,131.
Patented May 30, 1922.
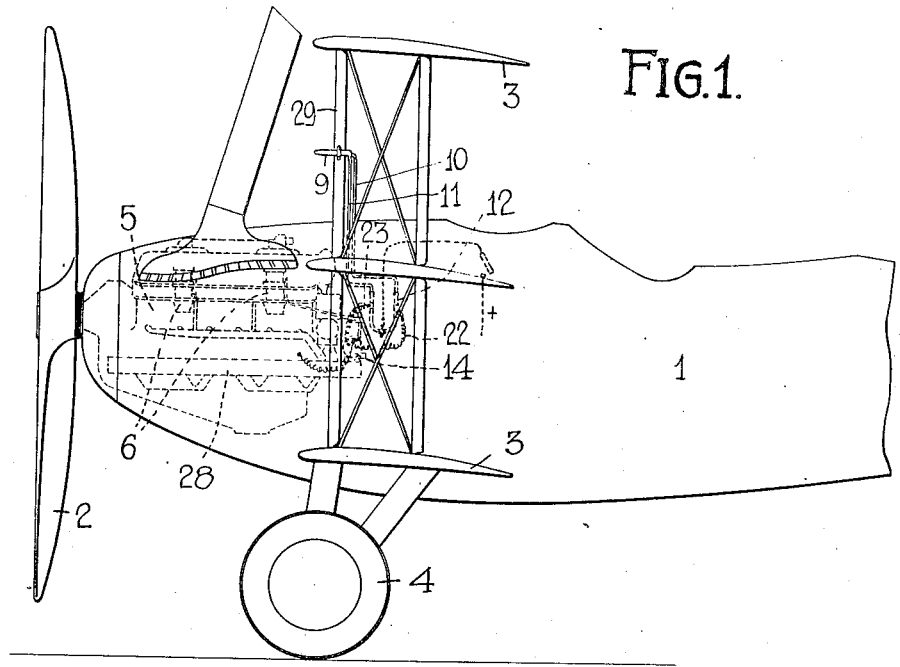
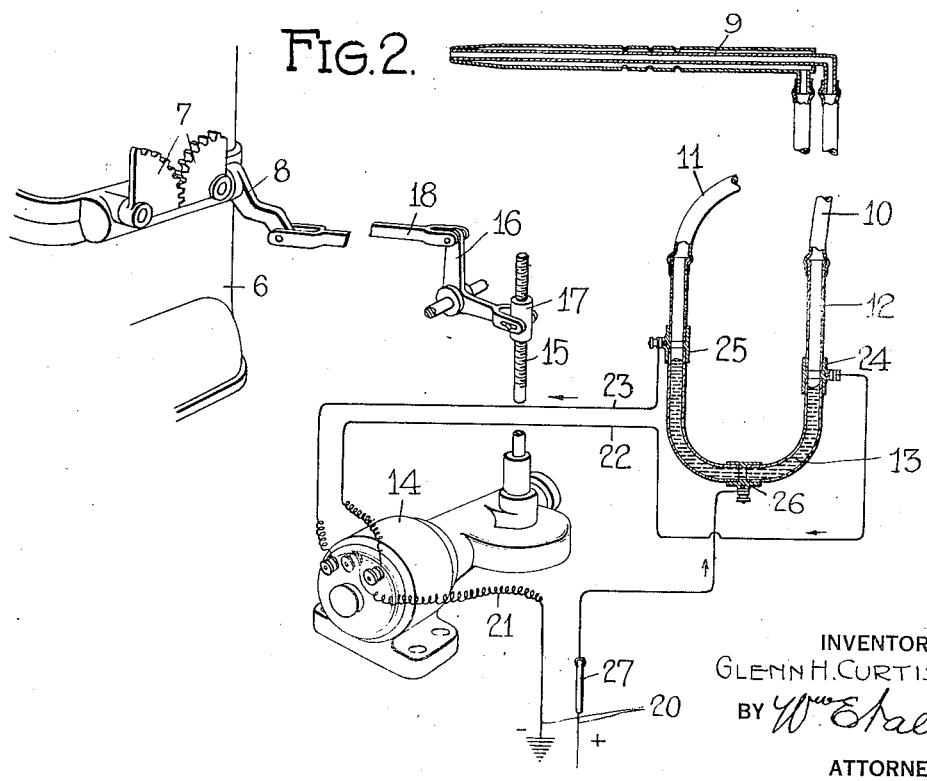
INVENTOR
GLENN H. CURTISS.
BY
ATTORNEY

UNITED STATES PATENT OFFICE.

GLENN H. CURTISS, OF GARDEN CITY, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

MOTIVE-POWER SYSTEM FOR AIRCRAFT.

1,418,131.     Specification of Letters Patent.     Patented May 30, 1922.

Application filed June 11, 1919. Serial No. 303,502.

*To all whom it may concern:*

Be it known that I, GLENN H. CURTISS, a citizen of the United States, residing at Garden City, in the county of Nassau and State of New York, have invented certain new and useful Improvements in Motive-Power Systems for Aircraft, of which the following is a specification.

This invention relates to the driving of aircraft and particularly to the regulation of the power plant thereof, as for instance, power plants of the internal combustion engine type.

For the most efficient and reliable operation of aircraft, and particularly aircraft of the aeroplane type, it is essential that the craft be driven and operated normally at what is known as the "cruising" speed. The cruising speed is generally 65% to 85% of the maximum speed of the craft, and as the craft and its power plant are usually designed, is the most efficient and economical speed of operation, the fuel consumption per mile at this particular speed being a minimum. The radius of action, therefore of the airplane is a maximum at this speed, and moreover, operation at such speed contributes to the general safety and reliability of the craft since the power plant is operated at reduced power and more enduring speed.

An important feature of the present improvements resides in a power system wherein the speed of the aeroplane is limited under normal operations to and maintained at the "cruising" speed, and thereby the most efficient and reliable performance is assured. In accordance therewith I have devised means in response to the air velocity for automatically controlling, regulating and limiting the speed of the power plant, as for instance an internal combustion engine, which is generally used for driving airplanes. More particularly I have devised a controlling apparatus including an air velocity responsive device such for instance as a Pitot tube, which in response to changes of air velocity actuates or causes an adjustment of the throttling valve of the engine for regulating the speed and thereby maintaining the speed of the craft at the more efficient or cruising speed during the normal conditions of operation.

For a better understanding of the improvements, reference may be had to the drawings accompanying this application which illustrate one embodiment thereof, wherein—

Fig. 1 shows the application of my invention to an aeroplane, and

Fig. 2 shows in more detail the system of control employed.

Referring to the drawings wherein like numerals designate similar parts throughout, an airplane is illustrated embodying a main body or fuselage 1; a propeller 2; planes 3; a running gear 4, and the driving engine 5, this engine being of the conventional internal combustion type. The usual carbureter of the engine is indicated at 6, and a throttle valve actuating mechanism is designated by the numeral 7, this actuating mechanism comprising two meshing sectors which are operated by the lever 8. As a particular device for controlling the actuation of the sectors 7 and the lever 8, I have illustrated more or less diagrammatically a Pitot tube 9, the trailing and leading pressure chambers which lead through flexible connections 10 and 11 to a U shaped manometer tube 12. A conducting liquid 13 is contained in this tube 12, and as will appear, serves to effect connection and control of a pilot motor which drives the throttle valve actuating mechanism 7 and 8. The pilot motor in the present embodiment consists of a reversible electric motor 14, the latter being geared to a vertical shaft 15 which in turn is operatively connected with the lever 8 through the medium of a bell crank lever 16, a travelling nut 17 which is pivoted to one of the arms of the lever 16, and the connecting link 18 disposed between the bell crank lever 16 and the lever 8. A supply circuit 20 is indicated for supplying electrical energy to the motor 14, the neutral terminal of the motor 14 leading through a flexible connection 21 to the ground or low side of the supply circuit 20. The reversible connections of the motor lead through connections 22 and 23 to metallic terminals 24 and 25; these metallic connections 24 and 25 being adapted to contact with the upper ends of the U shaped column of liquid 13 within the manometer tube 12. The liquid is in permanent connection with one side of the supply circuit 20 through the metallic terminal 26 and through a suitable switch 27. The motor 14 may be supported in any suitable manner within the main body or fuselage 1 and as indicated in Fig. 1 it is carried by one of the engine beams 28. The Pitot tube 9 may be carried in any suitable manner by the craft, as for instance, by the strut 29. It is understood, however, that the illustrations are more or less diagrammatic.

The operation of the invention is as follows: The apparatus is so adjusted that at the normal or "cruising" speed of the craft, as determined by the air velocity, the conducting liquid 13 contacts neither with the terminal 24 nor the terminal 25, but in the event that the speed of the aircraft should momentarily become too high or too low the liquid 13 is caused to contact with the corresponding terminal 24, (or 25) thereby bridging these contacts with the main terminal 26 and establishing electrical communication between the motor 14 and the supply circuit 20. Depending upon which of the terminals 24 and 25 is brought into circuit, the motor is caused to revolve in the proper direction to actuate the throttle valves through the intermediate mechanism above described to bring the speed of the craft to the required value for efficient operation and as adjusted by the apparatus. As soon as the throttle valve is adjusted to the proper value to bring the speed down (or up) to the required value, the electrical circuit is broken at the terminal 24 (or 25) and the throttle valve remains in the adjusted position until further adjustment is necessary due to a departure from normal speed. It is apparent therefore that by an arrangement of this sort, the speed of the craft may be automatically maintained at any speed desired for operation, without the necessity for any particular care on the part of the pilot and independently of him, the air velocity apparatus at all times being effective to control and regulate the speed.

In accordance with the requirements of the patent statutes I have set forth one complete embodiment of my improvements in a specific manner required thereby, but it is understood that the claims annexed hereto are to be construed in accordance with the spirit of the invention and are not to be limited to the specific devices set forth and illustrated, except as is specifically recited therein.

I claim:

1. In a power apparatus for aeroplanes, the combination of an internal combustion engine, a throttle valve therefor, an air velocity device comprising a Pitot tube and a manometer tube, a reversible electric motor operatively connected with said throttle valve, and electrical energy supply connections leading through said device to said motor for the purpose set forth.

2. In an apparatus of the type set forth, the combination of a driving engine, a Pitot tube, and means interposed between the Pitot tube and the engine for regulating the speed of the engine according to the indicated air velocity.

3. In an apparatus of the type set forth, the combination of a driving engine, a Pitot tube, and electrically operated mechanism including a manometer tube interposed between the Pitot tube and the engine for regulating the speed of the engine according to the indicated air velocity.

4. In an apparatus of the type set forth, the combination of a driving engine, an air velocity responsive device, a manometer, means interposed between the air velocity responsive device and the motor, such means being operable in response to velocity changes to govern the operation of the motor, and a connection between the motor and the driving engine to regulate the speed of said engine according to the operation of the motor.

5. In an apparatus of the type set forth, the combination of a driving engine, an air velocity responsive device, including a manometer tube containing a fluid substance movable within the tube in response to air velocity changes, an electric motor, the operation of the motor being under the control of the fluid contained in the manometer tube, and a connection between the motor and the driving engine to regulate the operating speed of the motor according to changes in velocity and according to the action of the fluid aforesaid.

In testimony whereof I hereunto affix my signature.

GLENN H. CURTISS.